United States Patent [19]

Ramme et al.

[11] Patent Number: 4,589,611

[45] Date of Patent: May 20, 1986

[54] AIR JET REACTION CONTRAROTATING ROTOR GYRODYNE

[76] Inventors: Maurice Ramme, 6326 Beach Dr. SW., Seattle, Wash. 98136; Monte Ramme, 17620 - 15th Pl. W., Alderwood Manor, Wash. 98036

[21] Appl. No.: 471,563

[22] Filed: Mar. 1, 1983

[51] Int. Cl.$^4$ .................. B64C 27/18; B64C 27/22
[52] U.S. Cl. ..................... 244/6; 244/17.23; 244/12.3; 244/52; 416/20 R; 416/90 R
[58] Field of Search ............... 244/6, 7 R, 7 A, 7 B, 244/12.1, 12.3, 23 B, 52, 55, 17.11, 17.23; 416/20 R, 20 A, 21, 22, 90 R, 90 A, 92, 129, 128, 144; D12/326, 327, 335, 343

[56] References Cited

U.S. PATENT DOCUMENTS

| | | | |
|---|---|---|---|
| D. 178,598 | 8/1956 | Fletcher | D12/327 |
| D. 220,852 | 6/1971 | Gamaunt | D12/335 |
| 1,133,660 | 3/1915 | Papin et al. | |
| 2,437,700 | 3/1948 | MacFarland, Jr. | 416/129 |
| 2,443,936 | 6/1948 | Stalker | |
| 2,617,487 | 11/1952 | Stalker | |
| 2,630,868 | 3/1953 | Ellenberger | 416/144 |
| 2,644,533 | 7/1953 | Maillard et al. | |
| 2,818,223 | 12/1957 | Doblhoff | |
| 2,831,543 | 4/1958 | Matthews | |
| 3,159,360 | 12/1964 | Ryan et al. | 244/7 A |
| 3,176,413 | 4/1965 | Dornier | 244/17.11 |
| 3,368,778 | 2/1968 | Wilde et al. | 244/7 R |
| 3,381,474 | 5/1968 | Gist, Jr. | 244/12.3 |
| 3,417,825 | 12/1968 | Ramme | |
| 3,622,104 | 11/1971 | Clarke et al. | 244/12.3 |
| 3,771,924 | 11/1973 | Buchstaller | 244/7 A |
| 3,792,827 | 2/1974 | Girard | 244/7 A |
| 3,917,435 | 11/1975 | Wilkerson et al. | 416/20 R |

FOREIGN PATENT DOCUMENTS

| | | | |
|---|---|---|---|
| 672424 | 3/1939 | Fed. Rep. of Germany | 416/144 |
| 56829 | 10/1952 | France | 416/20 |
| 895590 | 5/1962 | United Kingdom | 244/7 R |
| 1405164 | 9/1975 | United Kingdom | 416/20 |

OTHER PUBLICATIONS

*McGraw-Hill Encyclopedia of Science and Technology,* Third Edition, 1971, vol. 6, pp. 435, 440 and 441.
*McGraw-Hill Encyclopedia of Science and Technology,* Third Edition, 1971, vol. 3, pp. 504 and 506.
*National Aeronautics and Space Administration Aeronautical Dictionary,* 1959, United States Government Printing Office, Washington, D.C., pp. 46 and 87.

*Primary Examiner*—Galen L. Barefoot
*Attorney, Agent, or Firm*—Robert W. Beach; Ward Brown

[57] ABSTRACT

A high wing, twin jet gyrodyne having air jet reaction, contrarotating rotors powered with bypass air from twin turbofan engines. Tail pipes from the turbofan engines are disposed parallel to and at opposite sides of a longitudinal duct for discharging bypass air rearwardly. Control valve means can control supply of bypass air selectively to the hollow rotor mast for driving the rotors and to the longitudinal air discharge duct. The aft portions of the tail pipes and of the air discharge duct are connected by a horizontal stabilizer and rudders are located in the slipstream discharged from the tail pipes and the air discharge duct. The wings have drop tip sections providing flotation outriggers in their downwardly projecting positions.

7 Claims, 16 Drawing Figures

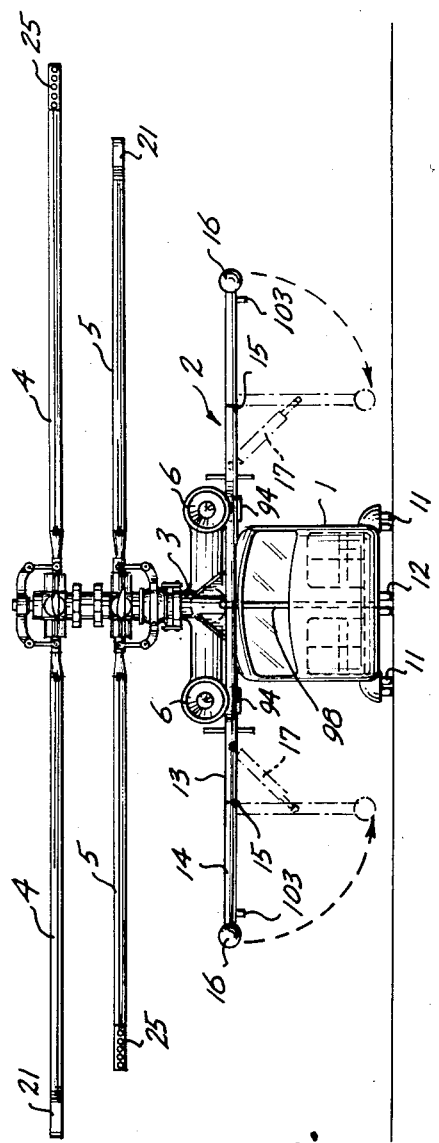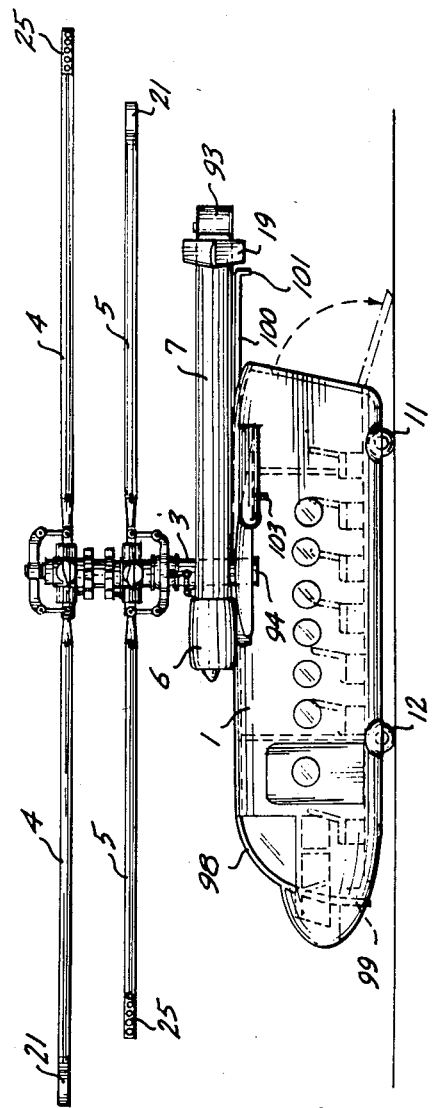

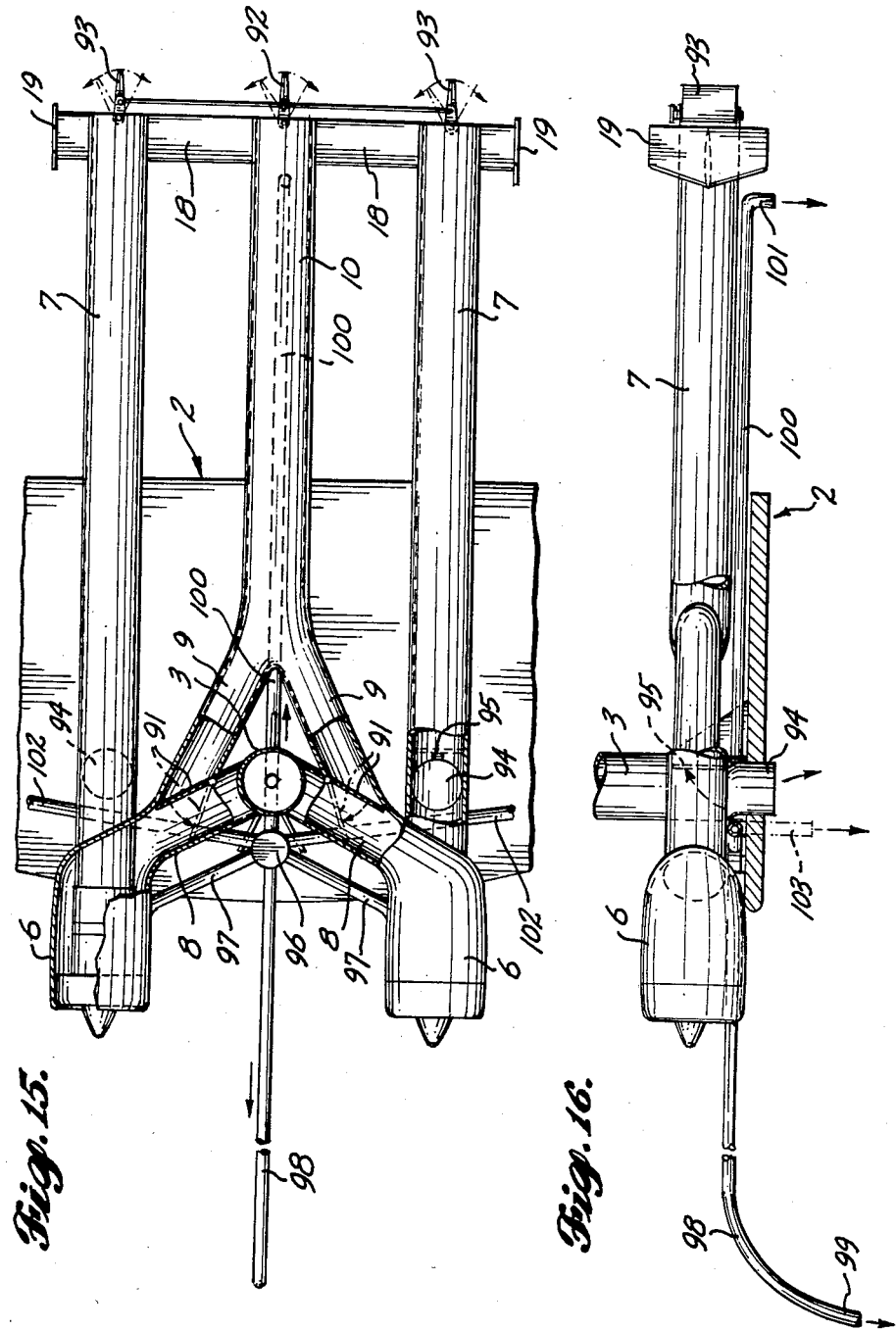

AIR JET REACTION CONTRAROTATING ROTOR GYRODYNE

BACKGROUND OF THE INVENTION

Field of the Invention

This invention relates to a twin jet gyrodyne supported by air jet reaction contrarotating rigid rotors, powered with turbofan bypass engines and having drop tip wings.

Objective

An objective in the design of aircraft has been to provide an aircraft capable of vertical takeoff and landing, having high speed in horizontal flight and being of simple construction and easy to operate.

Prior Art

Prior art aircraft have not been able to accomplish the objective stated above and the present invention is not able to achieve the objective completely but provides a closer approach to it than prior aircraft.

An airplane can fly horizontally at high speed, but instead of being able to take off vertically, requires considerable horizontal run in order for the relative wind, i.e. flow of air past the wings, to enable the wings to develop sufficient lift to sustain the weight of the airplane. In order to enable airplane wings to develop sufficient lift at lower speeds, forward wing slots, trailing edge wing flaps and other wing modifications have been utilized, but airplanes with such high-lift devices still require a substantial horizontal run in order to take off.

Autogiros can take off with a much shorter run than short takeoff and landing (STOL) airplanes, and some autogiros can even make jump takeoffs, but cannot continue to rise vertically for any substantial distance since their rotors autorotate, that is, are revolved reactively by the relative wind. The speed of the autogiro in horizontal flight is limited as compared to the speed of an airplane by rotor blade stall. Also, a rotor installation, whether in an autogiro or a helicopter, is structurally and mechanically more complicated than the fixed wing of an airplane.

The gyroplane type of autogiro is capable of higher forward speed than an autogiro having a rotor the blade pitch of which can be changed only collectively, by providing cyclic pitch control for the rotor blades so that the pitch of a blade when it is advancing is less than when it is retreating.

A helicopter is capable of vertical takeoff and landing and can hover because its rotor is powered, but its maximum horizontal speed is even less than that of an autogiro and it is more complicated mechanically because its rotor is powered instead of being autorotating. Driving of some helicopter rotors has been simplified somewhat by powering them with reaction gas jets instead of mechanical gear drives, such as disclosed in the following U.S. patents:

Papin et al. U.S. Pat. No. 1,133,660;
Stalker U.S. Pat. No. 2,443,936;
Stalker U.S. Pat. No. 2,617,487;
Doblhoff U.S. Pat. No. 2,818,223;
Mathews U.S. Pat. No. 2,831,543.

In order to enable the maximum horizontal speed of helicopters to be increased somewhat, contrarotating rotors have been used, driven by gearing, such as shown in FIG. 4 of the Maillard et al U.S. Pat. No. 2,644,533.

Air turbines were used to rotate contrarotating rotors in Ramme U.S. Pat. No. 3,417,825.

Attempts have been made to combine the high-speed capability of airplanes and the vertical takeoff and landing capability of helicopters by convertiplanes which have been provided with some type of mechanical conversion to change the thrust direction from vertical to horizontal, such as an airscrew that can be altered mechanically to rotate either in a horizontal plane to serve as a rotor, or in a vertical plane to serve as a propeller. In some instances, the rotor blades have been locked to serve as fixed wings. In other instances, ducted fans have been mounted turnably on the ends of fixed wings to direct thrust alternatively upward and forward. In still other instances, propellers have been mounted on wings to produce thrust chordwise of the wings and the wings have been turnable relative to the airplane fuselage about spanwise axes. The principal difficulty with such convertiplanes is problems produced in making the transition from vertical flight to horizontal flight.

A further proposal to accomplish the objective stated above is the gyrodyne or compound helicopter. A gyrodyne is defined in the *National Aeronautics and Space Administration Aeronautical Dictionary*, 1959, as follows:

A rotating-wing aircraft whose rotor or rotors provide lift only, the system customarily being powered for take-off, hovering, landing, and for forward flight throughout part of its speed range, but usually autorotating at the higher flight speeds, forward propulsion being provided by a propeller or jet.

The gyrodyne is manufactured in a number of different varieties: with or without wings in addition to its rotor; with different mechanical arrangements for lift equalization over the rotor; with or without separate power plants for the rotor and forward-propulsion system; etc.

The *NASA Aeronautical Dictionary* states that the term "compound helicopter" is a synonym for gyrodyne but is used rarely.

Prior gyrodynes or compound helicopters include:
the Lockhead AH-56 mentioned in the *McGraw-Hill Encyclopedia of Science and Technology*, Third Edition, 1971, Volume 6, page 435, column 1, bottom; and page 441, column 1, top, and shown in FIG. 8(e) on page 440; and also shown in Volume 3, page 504, FIG. 4; and mentioned on page 506, column 1, top; and the McDonald XV-1 mentioned and shown in the *McGraw-Hill Encyclopedia of Science and Technology*, Third Edition, 1971, Volume 3, page 504, column 2, top, FIG. 3; and mentioned in Volume 3 on page 506, column 1, top.

Both of these gyrodynes have small fixed wings and single rotors.

SUMMARY OF THE INVENTION

It is the principal object of the present invention to provide a gyrodyne construction which is more efficient in producing vertical lift than single rotor helicopters, is less complicated than helicopters having contrarotating rotors that are rotated mechanically and which will have a higher forward speed than single rotor autogiros, helicopters or previous gyrodynes.

A further object is to provide a simpler and more efficient type of rotor installation.

It is also an object to simplify the propulsion of contrarotating rotors by utilizing air jet reaction propulsion instead of mechanical drive mechanism.

A further object is to proportion the supply of air between the rotors rotating contrarotationally to equalize the lift forces produced by the two rotors, or to unbalance such forces in a predetermined manner, as may be preferred.

Another object is to be able to control the utilization of bypass air supplied by twin turbofan engines in variable proportions to rotate contrarotating rotors reactively or to supplement exhaust gas jets from the engines by producing a rearwardly discharged air jet to increase horizontal flight propulsion force and to provide propulsion for taxiing with the rotors stationary.

An additional object is to provide drop tip wings the tip portions of which can be swung downward to reduce the effect of such tip portions in blanketing downdraft from the rotors and which tip portions further serve as outriggers for laterally stabilizing the gyrodyne if it is floating on water.

Another object is to interconnect the contrarotating rotors mechanically so as to coordinate their rotations not only so that the rotors will rotate at the same speed, but so that the positions in which blades of the upper and lower rotors are in registration as they cross each other during rotation can be controlled with respect to the fixed wing and fuselage of the gyrodyne.

The foregoing objects can be accomplished by providing a gyrodyne having a high fixed wing and air jet reaction contrarotating rigid concentric rotors carried by a holow central mast to which air is supplied by bypass air of twin turbofan engines carried by the wing at opposite sides of the mast, which engines also eject combustion gas jets rearward through outrigger tailpipes to provide jet propulsion for the gyrodyne, and which exhaust gas jets can be deflected laterally so that their thrusts are mutually canceled, or which can be deflected forward to provide dynamic braking or to propel the gyrodyne rearward. Trim control jets at the nose, tail and on the wings can control the attitude of the gyrodyne at low speeds. An outboard panel of each wing having an extent spanwise approximately equal to the vertical distance between the wing root and the bottom of the fuselage can be hinged to drop into depending upright position under the control of the pilot, and such drop wing tip section may have float tanks carried by their tips.

BRIEF DESCRIPTION OF THE DRAWINGS

FIG. 2 is a front elevation of the gyrodyne and

FIG. 3 is a side elevation of the gyrodyne.

FIG. 11 is a detail perspective showing control mechanism for the lower rotor blades, parts being broken away.

FIG. 15 is a somewhat diagrammatic plan of the engine installation, parts being broken away, and FIG. 16 is a somewhat diagrammatic side elevation of such installation with parts broken away.

DETAILED DESCRIPTION

Figure 1:
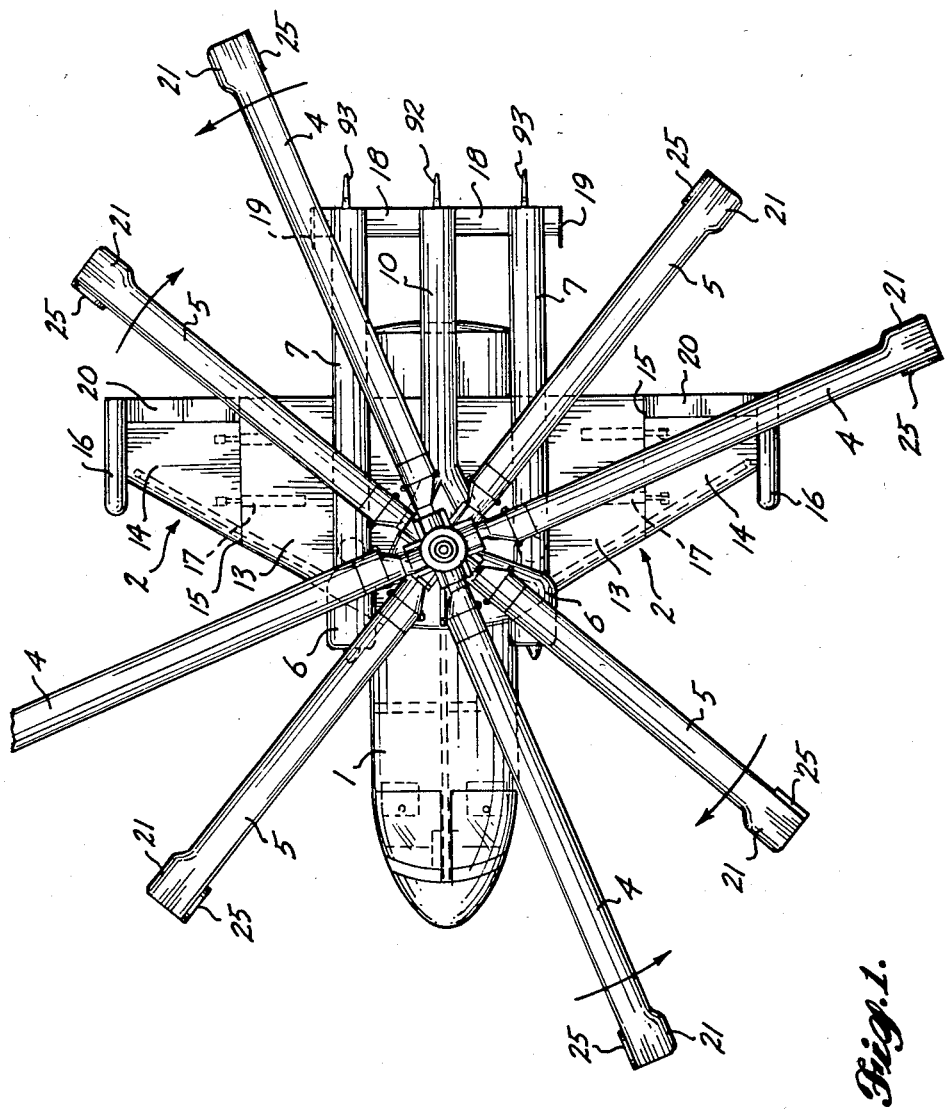
FIG. 1 is a plan of the gyrodyne.

While the principles involved in the gyrodyne of the present invention are adapted for use in larger aircraft, and to some extent for use in smaller aircraft, they are especially applicable to an aircraft of medium size such as would carry 20 to 40 passengers. In FIGS. 2 and 3 of the drawings, the fuselage 1 is shown as having a capacity for 24 passengers. Although the gyrodyne would have advantages over a helicopter or an autogiro without having a fixed wing, it is preferred that the gyrodyne have a fixed wing 2. Also, it is preferred that that wing be a high wing so as to provide a spanwise central platform structure for attaching the tubular rotor mast 3 in a position substantially coinciding fore and aft with the center of pressure of the wing and substantially coinciding with the center of gravity of the aircraft. Rotatively mounted on the rotor mast are an upper rotor having four blades 4 and a lower rotor having four blades 5 in contrarotational relationship.

As shown in FIGS. 2 and 3, the spanwise central platform of the high wing 2 also serves as a mounting base for twin turbofan engines 6 that are spaced laterally a distance slightly greater than the width of the fuselage 1 and at least partially forward of rotor mast 3, as shown in FIG. 2. The exhaust gas from the turbofan engines is discharged rearwardly through tail pipes 7 shown best in FIGS. 1, 4, 15 and 16 which also serve as outriggers. The bypass air from the turbofans is channeled into centrally-directed pipes 8 and conveyed either through the hollow of rotor mast 3 to the rotor blades 4 and 5 to provide reaction propulsion for the rotors, or through the branch rearwardly-converging conduits 9 which join to supply compressed air to the rearwardly-extending air-discharge conduit 10, located centrally between tail pipes 7, which serves as a further outrigger.

Although the aircraft is capable of vertical takeoff and landing, it is desirable to provide a light, wheeled, preferably tricycle, undercarriage including transversely spaced rear wheels 11 and a pair of steerable center forward wheels 12 to support the aircraft for taxiing over the ground. It is preferred, however, that the aircraft be of the amphibian type, which is a further reason for the wing 2 to be a high wing so as to provide maximum clearance from waves and spray. Such wing includes fixed root or inboard sections 13 at opposite sides of a center section or platform to which are joined tip or outboard sections 14. Such inboard and outboard sections cooperatively form a stub wing which preferably has a swept back leading edge. The inboard end of each outboard wing section of each wing is joined to the adjacent outboard end of the corresponding inboard wing section by a chordwise-extending hinge 15 to form a drop wing tip. The span of the tip section is such that a float 16 carried by its tip will be disposed slightly higher than the bottom of the fuselage 1 when the wing tip section is swung downward so as to form a flotation outrigger. The drop wing tip can be swung between its raised horizontal position and its lower drop position by a hydraulic jack 17 connected between the inboard wing section 13 and the outboard wing section 14 and bridging across hinge 15.

Figure 4:
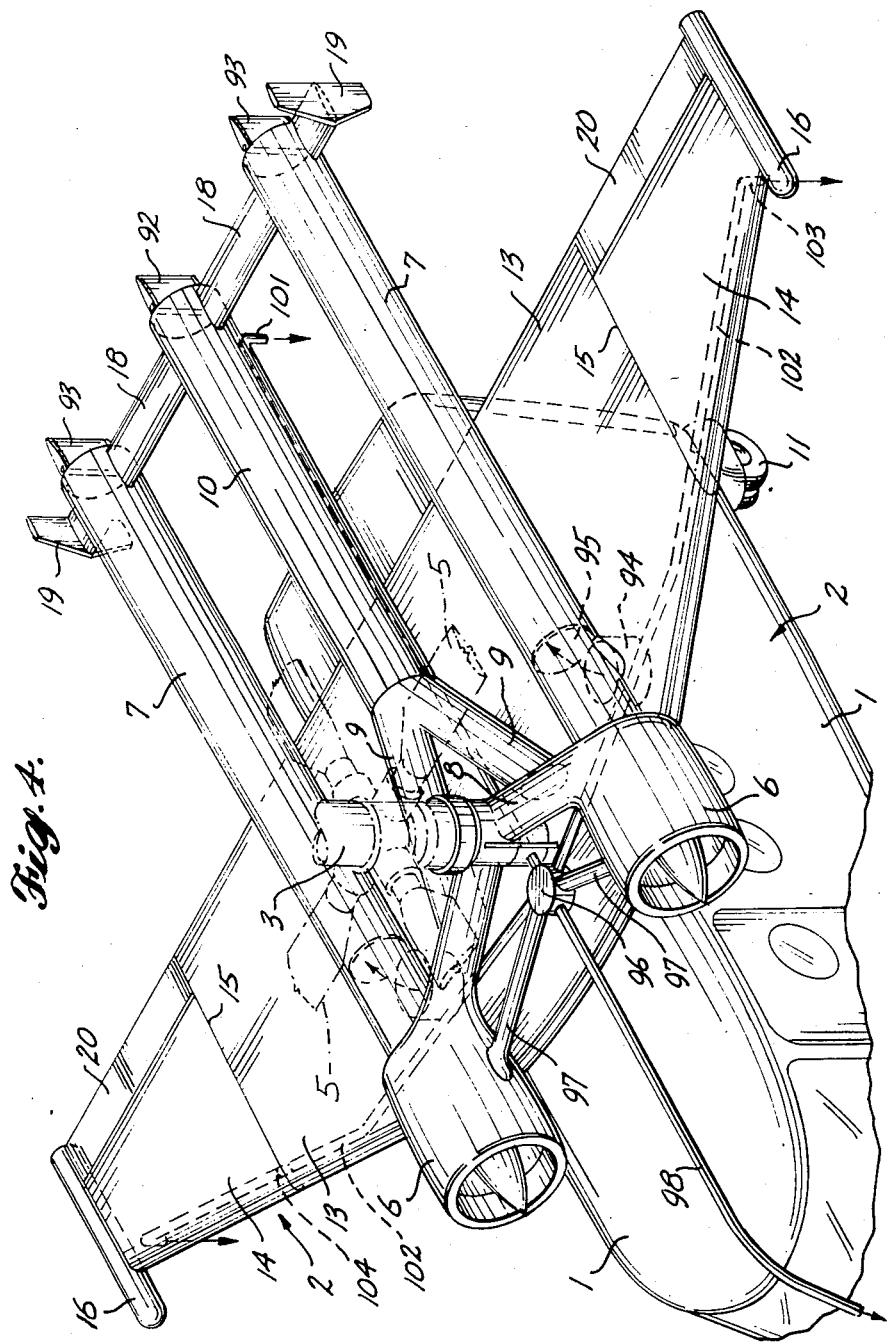
FIG. 4 is a top perspective of the gyrodyne with the rotors omitted.

The rearward portions of the outrigger tail pipes 7 and the air jet discharge duct 10 are connected by horizontal stabilizers 18, as shown in FIGS. 1 and 4. Vertical fins 19 are mounted on the outboard ends of the stabilizers. The tip sections of the outboard wing sections 14 may be provided with ailerons or flaperons 20 to assist rolling and directional control during forward flight and, if desired, to augment the lift of the wing 2.

Figure 5:
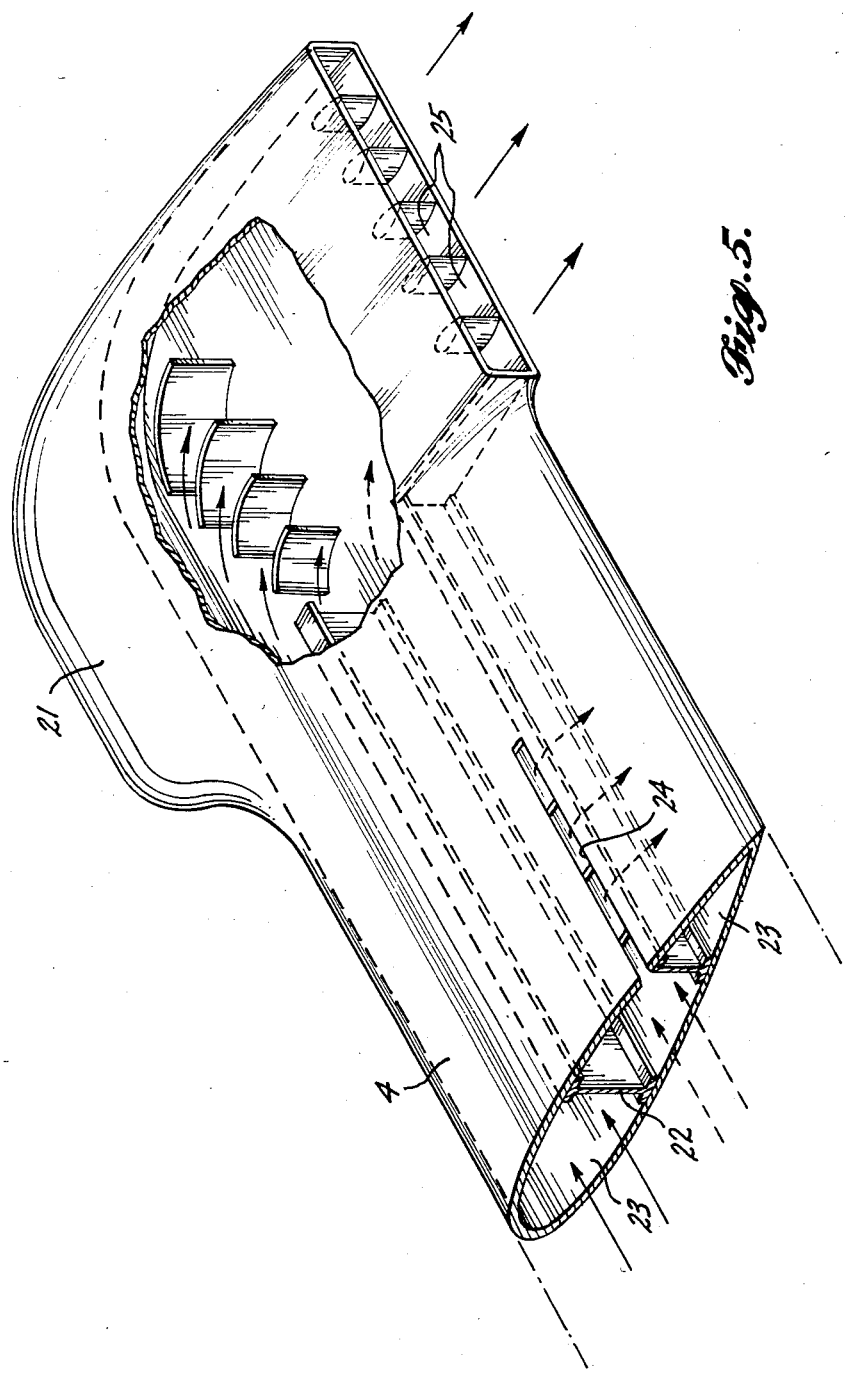
FIG. 5 is a top perspective of the tip portion of a rotor blade with parts broken away.

The blades 4 of the upper rotor and the blades 5 of the lower rotor may be identical, and interchangeable if the blades are of symmetrical cross section. The cross section of the blade 4 shown in FIG. 5, however, is not of symmetrical cross section. The spanwise axis about which the blade can turn to alter its pitch is located forward of the spanwise center of gravity of the blade, preferably substantially coincident with the center of pressure of the blade. In order to balance the blade statically about such axis and to provide additional mass for increasing the momentum of the blade in autorotation mode, a counterbalancing weight 21 can be located forwardly of the general leading edge of the blade, preferably at the blade tip as shown best in FIG. 5.

Spanwise stiffening of the blade is provided by a spanwise-extending spar 22 which divides the hollow of the blade into air passages 23 forward and rearward of it for flow of air from the rotor mast 3 outward through the blade even to its tip. Air may be discharged from the rear passage through rearwardly-directed boundary layer control slots 24 through the upper surface of the blade which may extend throughout substantially the entire span of the rotor blade, to increase lift and postpone stall of the blade. Such slots may be located approximately 60 percent of the chord aft of the leading edge of the blade. In addition to the rotor-rotating reaction produced by discharge of air through the boundary layer control slots, air can be discharged through apertures or nozzles 25 located at the blade tip and directed rearwardly. Such apertures or nozzles may be circular, oval, square or rectangular as may be preferred.

The root of each rotor blade 4 and 5 is formed as a hollow, cylindrical stub shaft 26 joined to the blade proper by a flaring adapter 27. The blade root stub shaft is received between the spider halves of a split hub 28 having radial hollow arms 29 that embrace the upper and lower sides of each blade root stub shaft. Such hollow spider arms have axially-spaced circumferential grooves 30 receiving combined radial-and-thrust bearings 31 encircling the blade root stub shafts to withstand the pull produced on the blade by the centrifugal force resulting from the rotor rotation while enabling the blade to turn about its axis for adjustment of the blade pitch. Collars 32 secured to the stub shafts 26 provide abutments preventing such shafts from being pulled spanwise out of bearings 31.

The meeting sides of the arms 29 of the spider hub halves have edge flanges that match when the split hub halves are assembled. Such flanges have holes in them located so that they will be aligned when the hub halves are assembled to receive bolts which clamp the hub halves in assembled relationship.

When the hub and blades of each rotor have been assembled, the rotors are mounted on the mast. Each hub has upper and lower annular end bearing seats 33 engageable, respectively, with antifriction thrust bearings 34 above and below each rotor. Such thrust bearings are held against movement axially of the mast by the weight of the rotor acting downward and by the lift that it produces acting upward. Downward movement of the upper rotor and movement of the lower rotor in both directions are prevented by anchor rings 35 of angle cross section encircling the mast close beneath the lower thrust bearing 34 of the upper rotor and alongside both bearings of the lower rotor. Such collars are secured to the mast by radial screws 36 extending through holes in the ring and the mast spaced circumferentially about the ring; the holes in one or the other part being tapped. Upward movement of the upper thrust bearing 34 is prevented by a thrust nut 37 screwed onto the upper end of the rotor mast instead of an upper anchor ring 35. Such thrust nut can be retained in place by radial screws 38 extending through it into the mast 3.

The upper end of the rotor mast 3 is closed by an end plate 39 having an annular shoulder providing a reduced portion which is inserted into the upper end of the mast and an upper circumferential flange abutting the end of the mast. Such end plate is retained on the mast and the entire mast is strengthened by a tension or tie tube 40 extending axially throughout the entire length of the mast. The upper end of such tube passes through a central aperture 41 in the end plate 39 and is retained in place by a nut 42. The lower end of such tension tube extends through the platform on which the turbofan engines 6 are mounted and which serves both as the top of the central portion of the fuselage 1 and the structure tying together the root portions of the wings 2.

Figure 6:
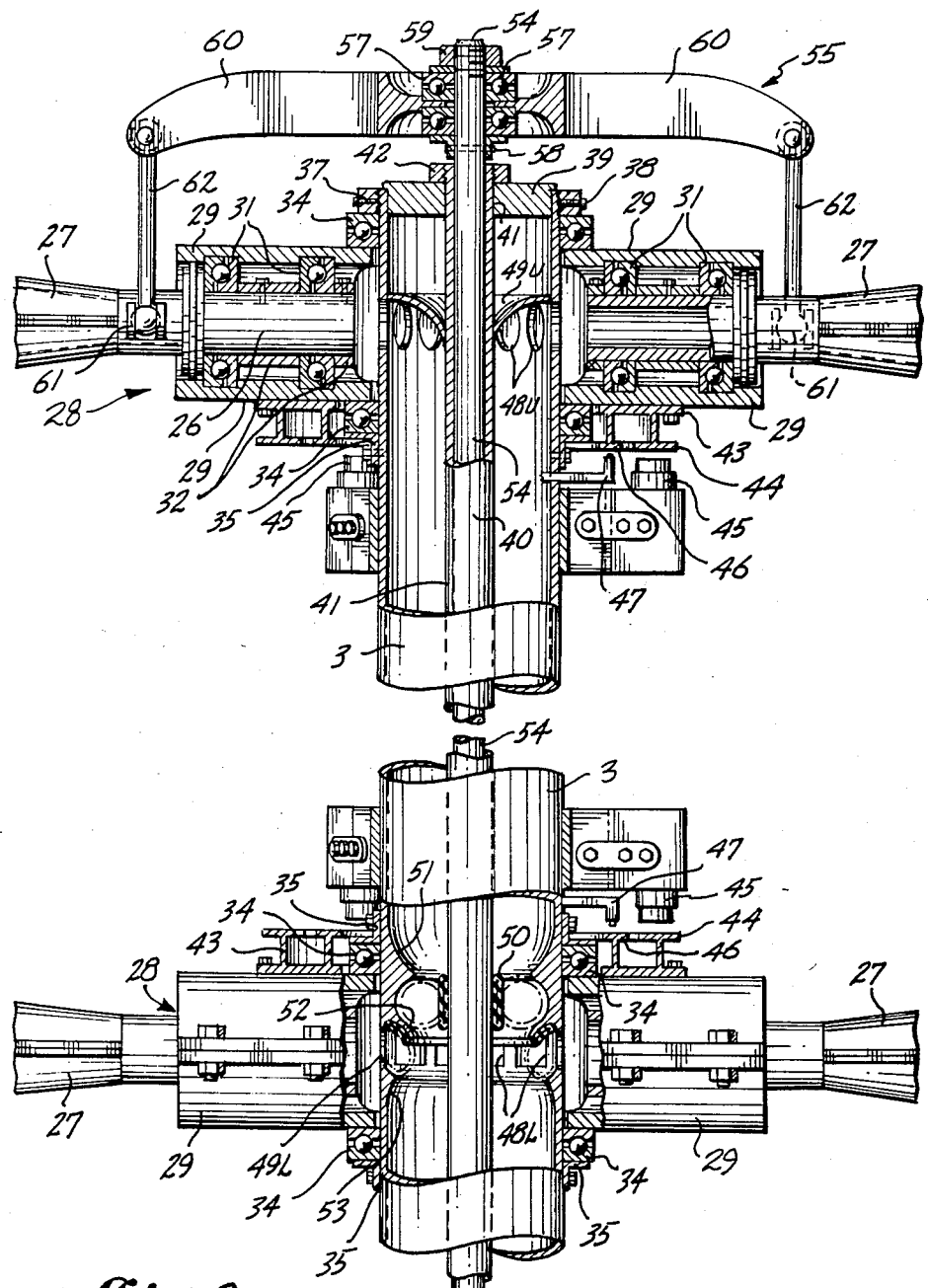
FIG. 6 is a side elevation of the central portions of the upper and lower rotors with parts of the rotor mast and parts of the rotor hubs broken away.
Figure 7:
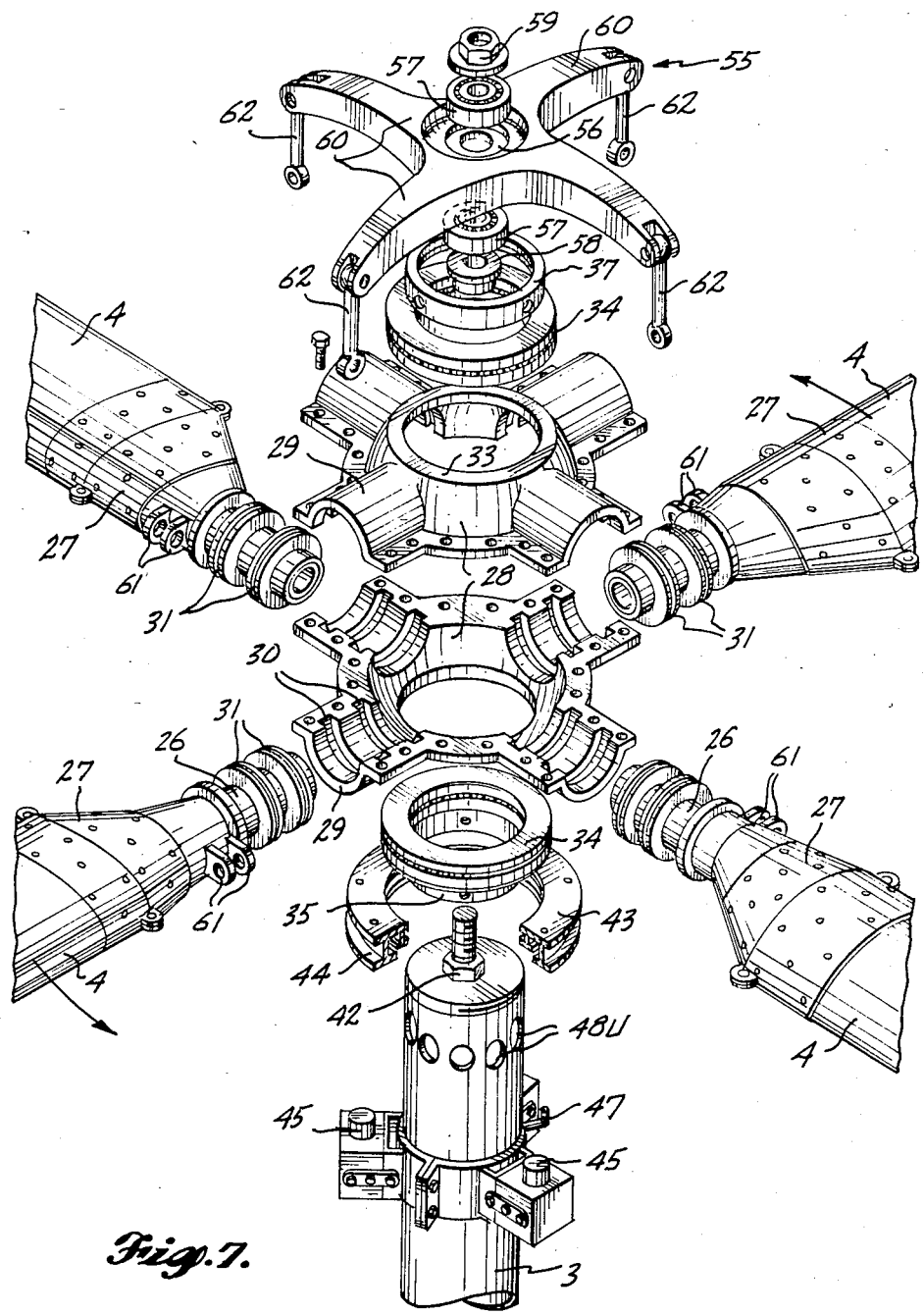
FIG. 7 is a top perspective of the upper portion of the rotor mast and the central portion of the upper rotor showing parts of the rotor hub and its mounting in exploded relationship.
Figure 8:
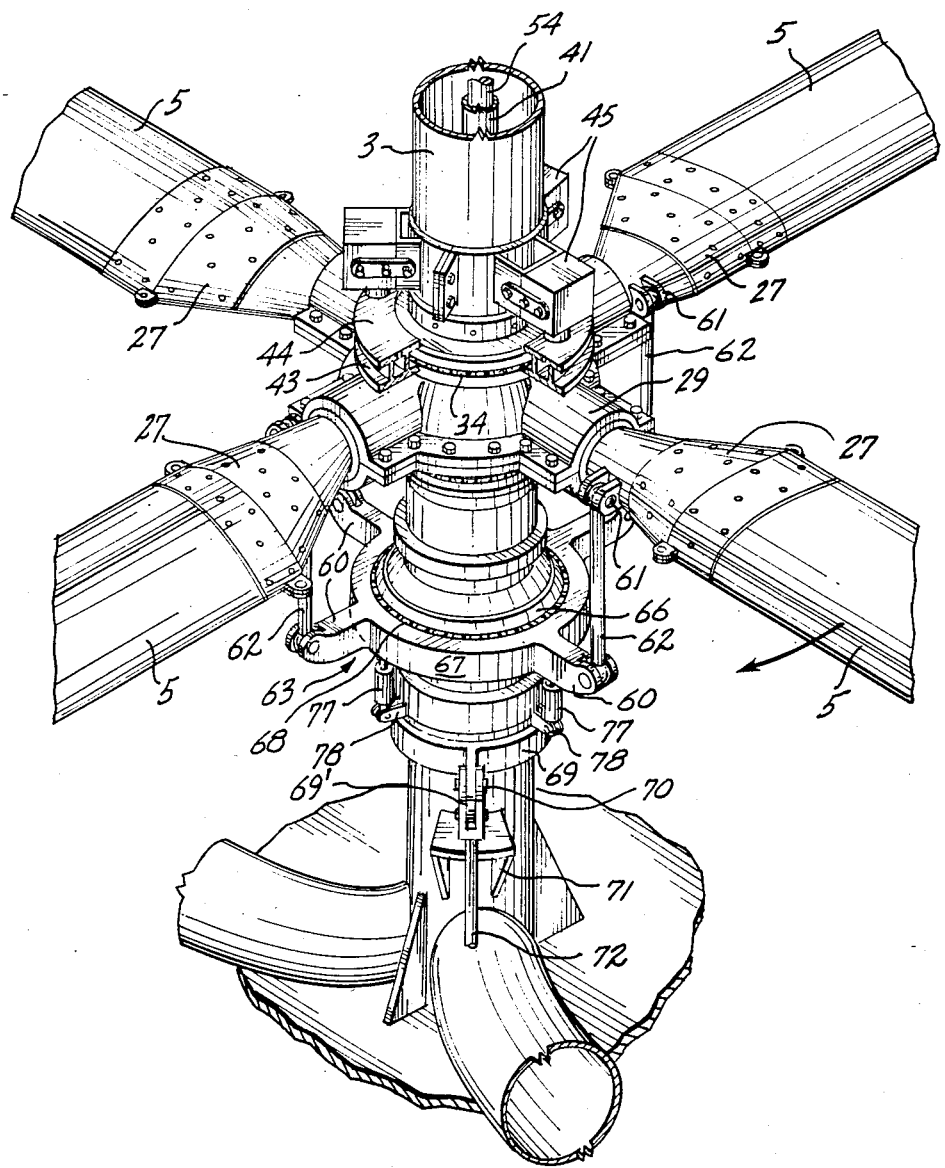
FIG. 8 is a top perspective of the central portion of the lower rotor and adjacent portions of the rotor mast.
Figure 9:
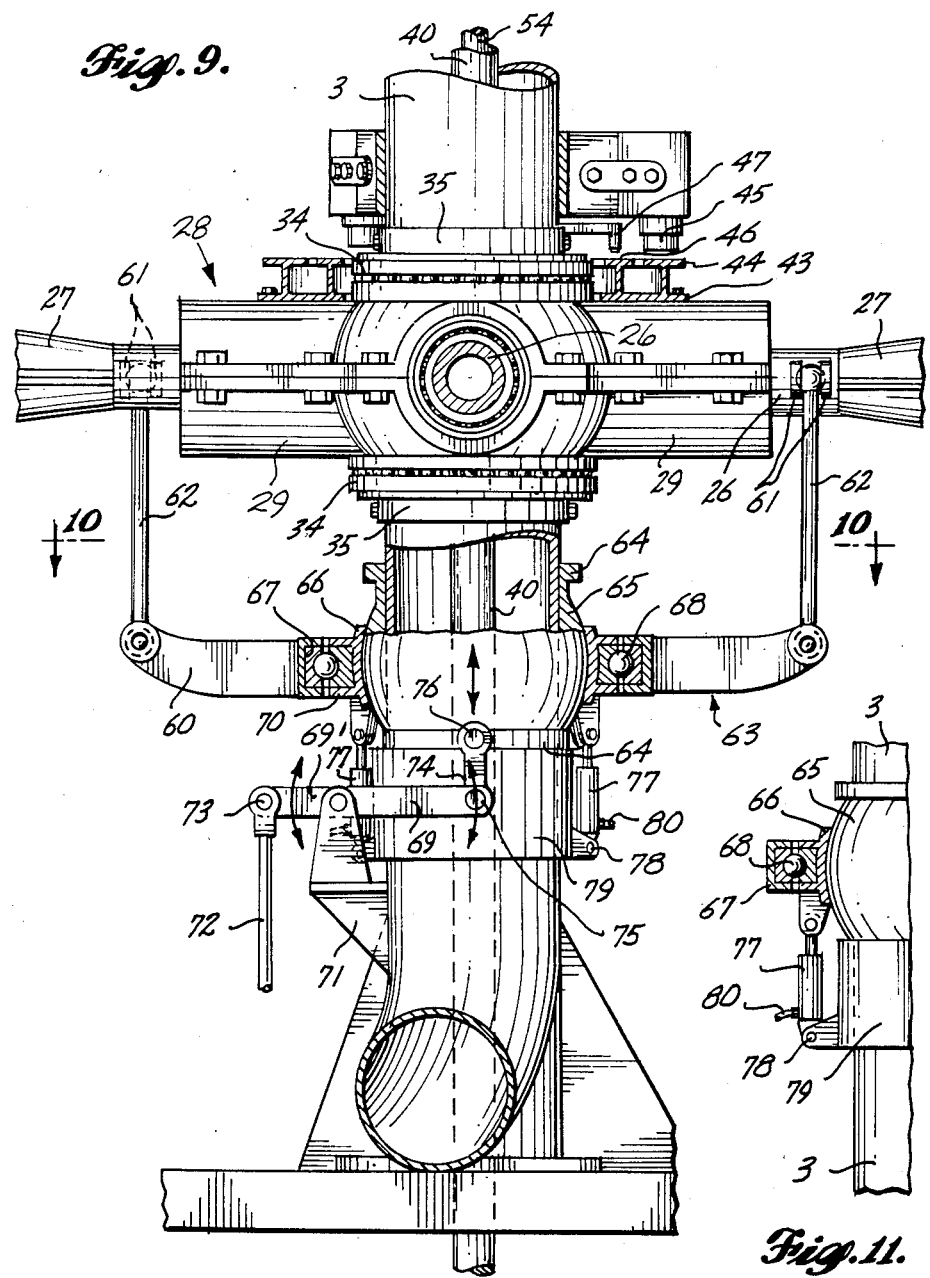
FIG. 9 is a side elevation of the central portion of the lower rotor and adjacent portions of the rotor mast, showing control mechanism for the rotor blades, with parts broken away.

Rings 43 are mounted respectively on the bottom of the top rotor hub and on the top of the bottom rotor hub which carry braking rings 44 engageable by the plungers of hydraulically operated or electrically-operated spot brakes 45 shown best in FIGS. 6, 8 and 9. Such brakes enable the speed of the rotors to be reduced controllably when they are in the autorotation mode and enable the rotors to be held against rotation when the aircraft is being taxied on the ground or on water.

In addition, the ring 43 has an auxiliary sensor ring 46 having in it circumferentially-spaced holes. The mast carries a sensor 47 having a head disposed adjacent to the auxiliary ring 46, providing a stationary magnetic sensing device the magnetic field of which is altered as each hole passes the head. The speed with which the rotor is turning is directly related to such magnetic field alterations that are converted by appropriate circuitry into an indication of the rotational speed of each rotor.

Air to drive the rotors reactively is supplied from the turbofan engines 6 to one or both of the rotors through the hollow mast 3. Air can flow from the mast into the hollow roots of the blades in the lower rotor through circumferentially spaced apertures 48L in the wall of the mast, which preferably are in the form of circumferential slots. Air is diverted from the mast through such slots by a deflector ring 49L projecting inward from the inner wall of the mast above such slots. The inner edge of such lower rotor deflector ring is spaced radially from the tie tube 40 sufficiently to provide an annular passage between such deflector ring and the tie tube through which air can flow to the upper rotor. If it is desired to restrict or block completely the flow of air through such passage to the upper rotor, an annular inflatable choke ring 50 mounted on the tube 40 can be inflated into the space between the deflector ring 49L and a constriction 51 above the deflector ring. To the extent that such passage is restricted, a greater proportion of air entering the mast will be supplied to the lower rotor than to the upper rotor.

Alternatively, the flow of air into the lower rotor through apertures 48L can be restricted or blocked completely by inflating an inflatable choke ring 52 mounted on the underside of the deflector ring 49L and distensible into engagement with the inner wall of the apertured mast and into engagement with a constriction 53 located below the deflector ring 49L. By controlled inflation of the choke ring 50 and the choke ring 52, all of the air supplied from the turbofan engines to the mast 3 can be delivered to the upper rotor, or all of such air can be delivered to the lower rotor, or the flow of air to the two rotors can be equalized or proportioned in any way desired. From the interior of the mast 3, air passing the constriction 51 flows into the hollow root stub shafts 26 of the upper rotor blades 4 through apertures 48U in the upper portion of the mast wall. The flow of air from the hollow mast through such apertures can be deflected smoothly by a downwardly concave annular deflector ring 49U bridging the gap between the inner wall of the mast and the outer wall of the central tube 40.

A collective pitch control thrust rod 54 extends through and is reciprocable lengthwise within tie tube 40. The upper end of this rod extends through an aperture in the center of a pitch control spider 55. Encircling such central aperture are upper and lower depressions 56 having central recesses of a size to receive snugly in them upper and lower antifriction bearings 57 disposed at opposite sides of a dividing web between such recesses. The lower bearing rests on a stop collar 58 pinned to the upper end of thrust rod 54 and the bearings and spider 55 are clamped between such stop collar and a nut 59 screwed onto the threaded upper end of collective pitch control rod 54.

Each arm 60 of the spider 55 is connected to radially-projecting lugs 61 on the root end of the corresponding blade by a link 62. Each pair of lugs 61 projects forward from a blade root in the direction of rotor rotation and receives the lower end of the link 62 between the lugs of such pair which is pivotally connected to such lugs. By shifting the collective pitch control rod upward, the spider 55 will be raised to pull links 62 and lugs 61 upward and turn the rotor blades for increasing their pitch.

Figure 10:
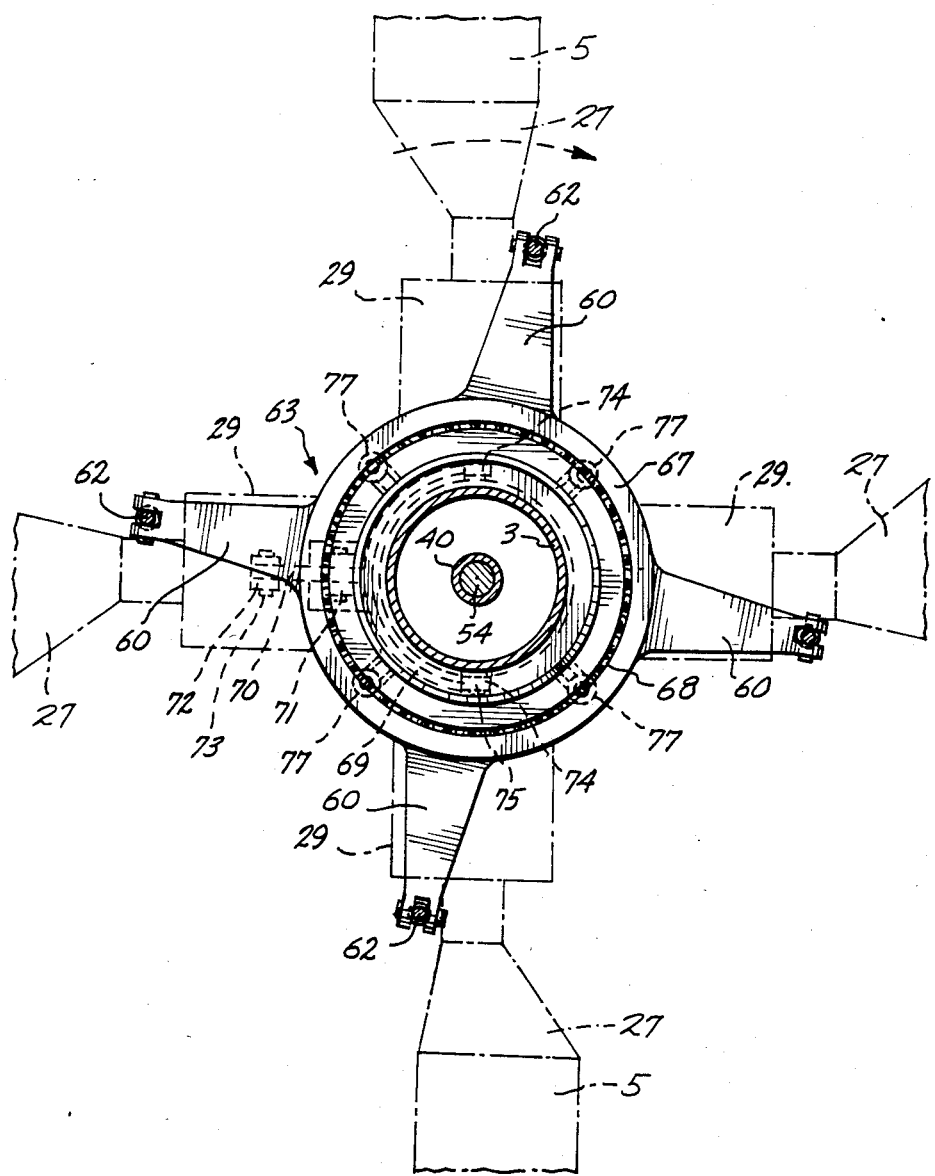
FIG. 10 is a horizontal section taken on line 10—10 of FIG. 9.

The mechanism described above is capable of adjusting the pitch of the upper rotor blades 4 only collectively. It is preferred for the pitch-adjusting mechanism for the blades 5 of the lower rotor to be capable of controlling the blade pitch both collectively and cyclicly. Such pitch control is effected by the pitch control spider 63 shown in FIGS. 9 and 10, which is similar to the spider 55 described above in having radial arms 60 connected by links 62 to lugs 61 projecting laterally from the hub portions of the individual rotor blades.

Instead of the spider 63 being shiftable only lengthwise of the rotor mast 3 to alter the pitch of the blades 5 collectively, such spider must be tiltable relative to the mast universally and must be capable of maintaining any given tilted position as to direction and degree during rotation of the rotor relative to the mast. To enable the spider yoke 63 to be shifted vertically along rotor mast 3 and to be tilted relative to the mast in any longitudinally adjusted position, the pitch control mechanism is mounted on a collar 64 that is slidable up and down the mast. The central portion 65 of such collar is spherically convex and is complemental to a spherically concave inner surface of an outer ring 66 encircling the collar. The ring 66 is rotatively isolated from the ring 67 connecting the arms 60 on the spider 63 by an antifriction radial-and-thrust bearing 68 so that the spider 63 can rotate relative to the ring 66 in all tilted and elevationally adjusted positions of the ring.

Elevational adjustment of collar 64 along the rotor mast 3 is effected by a control lever including a yoke portion 69 embracing the mast and an actuating arm 69' projecting outward from a fulcrum pivot 70. Such fulcrum pivot is supported on a bracket 71 attached to the side of the mast 3. The actuating arm can be swung up and down by a thrust rod 72 connected to the yoke arm by a pivot 73. The yoke portion 69 of the lever is connected to the collar 64 by a link 74 which is attached to the link by a pivot 75 and to the collar by a pivot 76. Reciprocation of rod 72 will swing the control lever 69, 69' to slide the collar 64 up or down the mast 3 for changing the pitch of the lower rotor blades 5 collectively corresponding to the extent of elevational change of collar 64 along the mast 3.

In order to be able to tilt the ring 66 relative to the spherical surface 65 with the pitch control collar 64 in various elevationally-adjusted positions of such collar, such tilting of the ring 66 is effected by appropriate adjustment of four small hydraulic jacks 77 mounted on pivots 78 supported from the downwardly extending skirt 79 of collar 64. One pair of such jacks is located in the longitudinal plane of the aircraft and another pair of such jacks is located in a transverse plane of the aircraft. The jacks are supplied with hydraulic liquid through hoses 80.

If it is desired to tilt the ring 66 fore and aft, hydraulic liquid will be supplied to one of the fore-and-aft jacks and a corresponding amount of hydraulic liquid will be drained from the other jack. Similarly, if it is desired to tilt ring 66 about a fore-and-aft axis, hydraulic liquid is supplied to one of the lateral jacks in appropriate amount and a corresponding amount of hydraulic liquid is drained from the other lateral jack.

Figure 12:
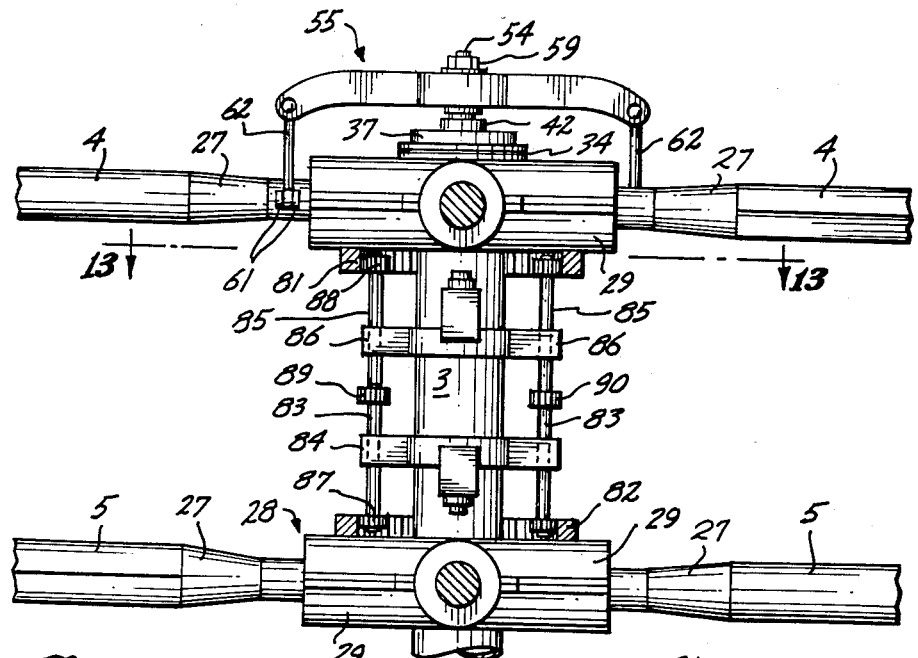
FIG. 12 is a side elevation of the central portions of the rotors and the rotor mast showing rotor interconnecting gear train mechanism for mechanically synchronizing rotation of the rotors.
Figure 14:
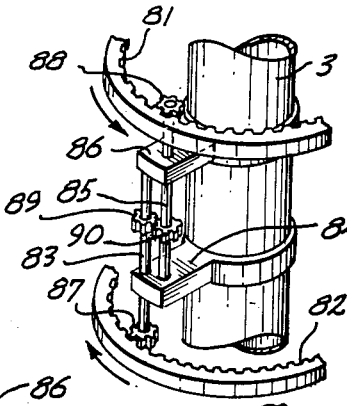
FIG. 14 is a detail perspective of a portion of such mechanism.
Figure 13:
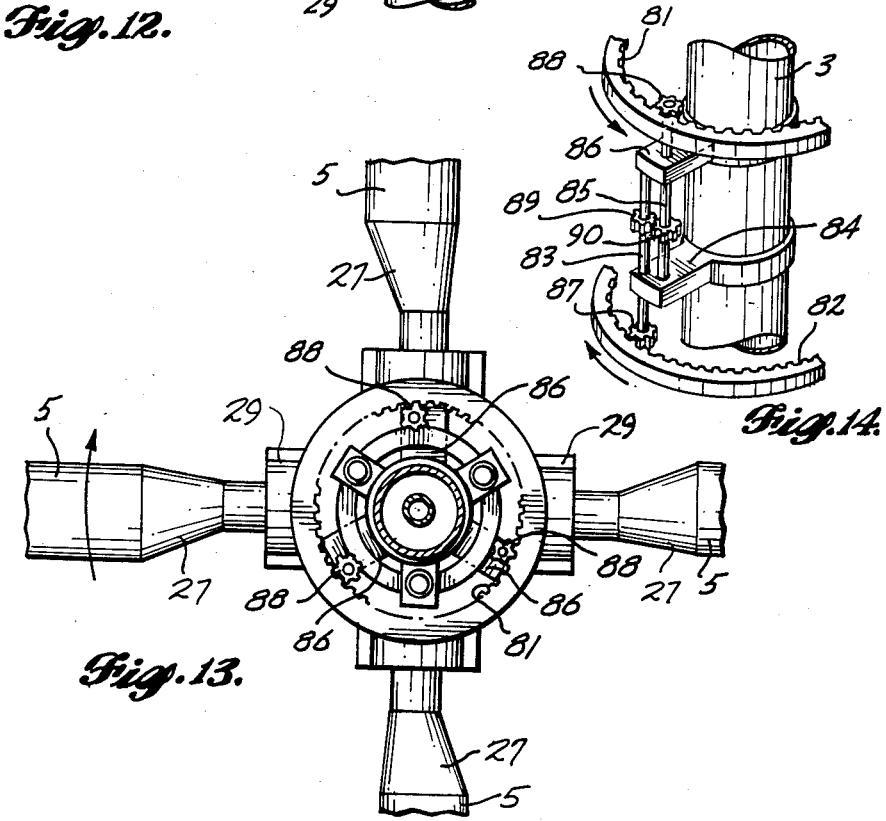
FIG. 13 is a plan showing such mechanism.

When the blades of the rotors cross during contrarotation of the rotors, the lower rotor blades will blanket to some extent the downwash from the upper rotor blades, decreasing the efficiency of the upper rotor. Also, when the blades of both rotors cross above the fuselage 1 and the fixed wing 2, such fuselage and fixed wing also blanket the downwash from the blades of both rotors. Consequently, it may be desirable for the blades of the upper and lower rotors to cross when they are in fore-and-aft position over the fuselage and in transverse position over the wing. In order to assure such crossing relationship, it would be necessary to interconnect the upper and lower rotors mechanically both to ensure their relative crossing at consistent positions during their rotation and to establish two such positions as being fore and aft over the fuselage and transversely over the wing. Mechanism for coordinating such rotation of the rotor blades 4 and 5 is shown in FIGS. 12, 13 and 14.

An internal ring gear 81 mounted on the lower side of the upper rotor hub and an internal ring gear 82 mounted on the upper side of the lower rotor hub are interconnected by gearing which will ensure coordinated equal and opposite rotation of the rotors. Such interconnecting gearing includes lower upright shafts 83 extending through a lower support 84 carried by and projecting outward from the mast 3 and upright upper shafts 85 extending through an upper support 86 carried by and projecting outward from the mast. The lower end of each lower shaft 83 has a gear 87 meshed with the internal ring gear 82 of the lower rotor and the upper end of each shaft 85 has a gear 88 meshed with the ring gear 81 of the upper rotor. The upper end portion of each lower shaft 83 carries a gear 89 meshing with a gear 90 carried by the lower end portion of an adjacent upper shaft 85. Preferably several paired shafts 83 and 85 are arranged around the mast, three sets of such shafts being shown in FIG. 13. Gears 89 and 90 cooperate to assure that the shafts 83 and 85 will rotate in opposite directions to coordinate equal rotation of the rotors in opposite directions.

It should be emphasized that the gearing interconnecting the upper and lower rotor hubs is not powered but is simply idler gearing. The propulsive force effecting rotation of each of the rotors is provided by reaction jets as described above. On occasion a small amount of power may be transmitted from either rotor to the other through the connecting gearing in order to synchronize their rotation, but in normal operation it is not intended that any appreciable amount of power be transmitted from one rotor to the other through such gearing.

Principally, FIGS. 4, 15 and 16 illustrate the air distribution and control system. Flow of bypass air from the turbofan engines 6 through the conduits 8 either to the mast 3 or to the branches 9 of thrust air discharge duct 10 is controlled by valves 91 that can be swung between positions closing the passages from ducts 8 to ducts 9, so that all of the bypass air will flow to the mast 3, and positions in which such valves extend across the ducts 8 so as to scoop all of the bypass air flowing into them from the engines into the branch ducts 9.

An aerodynamic control surface device 92 swingable about an upright axis is mounted at the discharge end of the air outlet duct 10. Similar control surface devices 93 swingable about upright axes are mounted at the discharge ends of tail pipes 7. Preferably, such upright control surface devices 92 and 93 are interconnected for joint swinging about their pivots.

Each of such control surface devices preferably includes two vanes that normally would be folded and disposed substantially in a longitudinal plane. The control devices can be swung to either side of such longitudinal plane, as indicated in broken lines in FIG. 15, to serve as rudders for controlling yaw of the aircraft when it is flying at considerable forward speed. The control surfaces are more effective for such yaw control because they are mounted in the slipstreams of the air discharge duct 10 and the turbine exhaust tail pipes 7.

Each of the yaw control devices 92 and 93 preferably includes two vanes that can be swung away from each other to deflect gas discharged from the pipes transversely of the aircraft for balancing engine thrust so that no propulsive force is applied to the aircraft, or the vanes can be separated sufficiently far to deflect the gas flowing from such ducts forward to serve as thrust reversers either for slowing forward movement of the aircraft or for actually effecting rearward movement of the aircraft.

The lift force afforded by rotation of the rotors can be supplemented when desired by downwardly directed exhaust gas thrust from the engines 6. Short, upright ducts 94 may extend from the tail pipes 7 downward through the wing 2 at locations preferably directly athwartships of the rotor mast 3. Valves 95 in the tail pipes can swing between positions closing the upper ends of ducts 94 so that all of the exhaust gas will be discharged rearwardly through the tail pipes 7 and upwardly swung positions blocking flow of exhaust gas through the tail pipes 7 rearwardly of the upright ducts 94 and acting to scoop the exhaust gas downward through such vertical jet thrust ducts 94.

Control air jets can be provided in addition to control surfaces for trimming or controlling the attitude of the aircraft fuselage particularly at low speeds. Air under pressure for such control jets can be supplied from a distribution valve 96 to which air is supplied under pressure by being bled from the compressor sections of the turbofan engines 6 into supply pipes 97. From the distribution valve 96, air may be supplied through a forwardly extending conduit 98 to a nose control jet 99 ejecting air downward to increase the pitch of the aircraft by reaction. Alternatively, air under pressure can be supplied from the distribution valve 96 rearwardly through duct 100 for discharge through the tail control jet 101 to reduce the pitch of the aircraft. Alternatively, or in addition, air under pressure can be supplied from the distribution valve 96 to one or the other of the conduits 102 extending from it through the wings 2 to wing tip jets 103 projectable downward. Such wing tip jets are mounted close to the tips of the wing drop tip sections 14 and consequently the air supply conduits 102 must cross the hinge 15 between the inboard wing sections 13 and the outboard wing sections 14. At the location of such hinge crossing, the conduits 102 may include a flexible coupling 104 in the nature of corrugated tubing which will enable the inboard and outboard sections of the conduit 102 to be swung relative to each other without interrupting their communication.

The flight capability of the gyrodyne of the present invention is very versatile. For takeoff, maximum lift can be accomplished by adjusting the blades of both the upper rotor and the lower rotor to high-pitch condition and by setting the tail-pipe valves 95 so as to deflect all of the exhaust gas discharge from the engines 6 downward through the upright ducts 94. The amount of lift and downward jet force can then be varied by simply altering the speed of the engines. If desired, the pitch of the rotor blades can be increased rather suddenly after the rotors have been brought up to substantial rotational speed so as to provide a sudden increase in lift to effect a jump takeoff.

When the aircraft has become airborne, horizontal or climbing flight can be accomplished by swinging valves 95 downward to close the upright thrust ducts 94 so that the exhaust gas from the engine will be projected rearwardly through the tail pipes 7.

For controlling the rate of climb of the aircraft, the collective pitch of the upper rotor blades 4 and the lower rotor blades 5 can be adjusted as desired by the use of more or less conventional pilot's controls. To alter the attitude of the aircraft, the pilot can adjust the cyclic control of the lower rotor blades 5 and may supplement such control by utilization of appropriate control jets selected from the nose control jet 91, the tail control jet 101 and the wing tip control jets 103.

As the forward speed of the aircraft increases, choke ring 50 and/or choke ring 52 shown in FIG. 6 can be inflated to reduce or block flow of air to the rotor blades, and valves 91 in ducts 8 can be swung to deflect engine bypass air from such ducts into branch ducts 9 so as to effect discharge of air from longitudinal duct 10 to supplement the thrust of the engine exhaust jets discharged from tail pipes 7. By such operation, one or both of the rotors can be converted to autorotation mode which will enable the horizontal speed of the aircraft to be increased.

During operation of the aircraft in the high horizontal speed range, yaw control can be accomplished by swinging the rudder devices 92 and 93 with their vanes folded and roll control can be effected by the flaperons 20. For pitch control either elevators could be provided on the horizontal stabilizers 18, or the nose control jet 99 and the tail control jet 101 could be utilized to effect such pitch control, or the cyclic pitch control mechanism for the blades 5 of the lower rotor could be utilized.

It may be desirable for the blades 5 of the lower rotor to be somewhat shorter than the blades 4 of the upper rotor so as to equalize substantially the lift between the upper and lower rotors, taking into consideration the action of the lower rotor blades 5 blanketing the downwash from the upper blades 4 to a greater or lesser extent as they cross during their contrarotation operation. Especially if the upper and lower rotors are not interconnected by gearing, as shown in FIGS. 12, 13 and 14, to ensure equal and opposite rotation of the rotors, it will be desirable for the pilot to be able to determine the rotative speed of each rotor by indicating mechanism responsive to the sensors 47 cooperating with the apertured rings 46. The relative speed of rotation of the two rotors can then be controlled by regulating the relative flow of air to them by appropriately inflating the air flow control ring 50 controlling flow of air to the upper rotor and/or inflating the control ring 52 controlling flow of air to the lower rotor.

When the gyrodyne is on water or land, both the rotor air choke ring 50, and the rotor air choke ring 52 should be inflated to block flow of air to both rotors and brakes 45 should be extended into engagement with the brake rings 44 to hold the rotors stationary. The discharge of exhaust gas through the tail pipes and the discharge of air through the longitudinal air duct 10 can then propel the aircraft forward and the rudder devices 92 and 93 can be swung appropriately to steer the aircraft, to stop it and to reverse its movement, if desired, simply by controlling the speed of engines 6.

We claim:

1. A gyrodyne comprising a hollow mast, contrarotating rotors carried by said hollow mast, turbofan engine means carried by the gyrodyne, air discharge means carried by the blades of said contrarotating rotors for discharging transversely thereof air received from said hollow mast to effect reaction rotation of said rotors, duct means connecting said turbofan engine means and said hollow mast for receiving bypass air from said hollow turbofan engine means and conveying it to said hollow mast for flow therethrough to the rotor blades, and control means for varying the distribution of the air flowing through said hollow mast from said hollow turbofan engine means to supply air to the blades of one of said rotors differing in amount from the amount of air supplied to the blades of the other of said rotors and being operable to vary the difference in such amounts including supplying to all the blades of one of said rotors substantially all the air flowing through said hollow mast from said turbofan engine means.

2. The gyrodyne defined in claim 1, in which each rotor blade is mounted to turn about a spanwise axis to alter its pitch, and counterweight means carried by the tip portion of each rotor blade and projecting forward beyond the major portion of the leading edge of each rotor blade for substantially balancing the rotor blade statically about such spanwise axis.

3. A gyrodyne comprising a fixed wing, a hollow mast mounted centrally of the gyrodyne, contrarotating rotors carried by said hollow mast, tail pipes extending rearward from said turbofan engines and disposed in substantially spaced parallel relationship for discharging exhaust gas from said turbofan engines and forming an outrigger, an air duct extending longitudinally behind said turbofan engines for discharging an air jet therefrom, duct means connecting said turbofan engines, said hollow mast and said air duct for receiving bypass air from said turbofan engines, control means for supplying at least a portion of the bypass air from said turbofan engines to said air duct for effecting jet thrust for the gyrodyne, means mounting each blade of each of said rotors to turn about a spanwise axis of such rotor blade for altering its pitch, counterweight means carried by the tip portion of each rotor blade and projecting beyond the major portion of the leading edge of each rotor blade turnable about a spanwise axis for substantially balancing the rotor blade statically about such axis, pitch control means for controlling the collective pitch of the blades of both of said rotors, brake means effective to retard the rotative speed of both of said rotors, means for proportioning the flow of air from said duct means through said hollow mast to said rotors, horizontal stabilizer means connecting the rearward end portions of said tail pipes and said air duct, vertical control surfaces mounted on said horizontal stabilizer means in alignment with the discharge ends of said tail pipes for controlling the direction of the gyrodyne, said vertical control surfaces being bifurcated and their bifurcations being spreadable to divert exhaust gas emitted from said tail pipes laterally and forward to constitute thrust-reversing means, downwardly directed control jet means including a nose jet, a tail jet and two wing jets carried by said wing at opposite sides of said hollow mast for projecting air downward to produce trim control forces, and means for supplying air under pressure from said turbofan engines to said control jet means.

4. A gyrodyne comprising a fixed wing, a hollow mast mounted centrally of the gyrodyne, controtating rotors carried by said hollow mast, twin turbofan engines mounted at opposite sides of said hollow mast, tail pipes extending rearward from said turbofan engines and disposed in substantially spaced parallel relationship for discharging exhaust gas from said turbofan engines and forming an outrigger, an air duct extending longitudinally behind said turbofan engines for discharging an air jet therefrom, duct means connecting said turbofan engines, said hollow mast and said air duct for receiving bypass air from said turbofan engines, control means for supplying at least a portion of the bypass air from said turbofan engines to said air duct for effecting jet thrust for the gyrodyne, means mounting each blade of each of said rotors to turn about a spanwise axis of such rotor blade for altering its pitch, pitch control means for controlling the collective pitch of the blades of both of said rotors and for controlling the cyclic pitch of the blades of at least one rotor, brake means effective to retard the rotative speed of both of said rotors, means for proportioning the flow of air from said duct means through said hollow mast to said rotors, horizontal stabilizer means connecting the rearward end portions of said tail pipes and said air duct, and vertical control surfaces mounted on said horizontal stabilizer means in alignment with the discharge ends of said tail pipes for controlling the direction of the gyrodyne, said vertical control surfaces being bifurcated and their bifurcations being spreadable to divert exhaust gas emitted from said tail pipes laterally and forward to constitute thrust-reversing means.

5. A gyrodyne comprising a high fixed wing, a hollow mast carried by said high fixed wing, contrarotating rotors carried by said hollow mast, twin turbofan engines carried by said high fixed wing at opposite sides of said hollow mast, tail pipes extending rearward from said turbofan engines and disposed in substantially spaced parallel relationships for discharging exhaust gas from said turbofan engines and forming an outrigger, an air duct extending longitudinally behind said turbofan engines for discharging an air jet therefrom, duct means connecting said turbofan engines, said hollow mast and said air duct for receiving bypass air from said turbofan engines, control means for supplying at least a portion of the bypass air from said turbofan engines to said air duct for effecting jet thrust for the gyrodyne, means mounting each blade of at least one of said rotors to turn about a spanwise axis of such rotor blade for altering its pitch, pitch control means for controlling the collective pitch of the blades of at least one of said rotors, brake means effective to retard the rotative speed of at least one of said rotors, means for proportioning the flow of air from said duct means through said hollow mast to said rotors, horizontal stabilizer means connecting the rearward end portions of said tail pipes and said air duct, vertical control surfaces mounted on said horizontal stabilizer means in alignment with the discharge ends of said tail pipes for controlling the direction of the gyrodyne, said vertical control surface being bifurcated and their bifurcations being spreadable to divert exhaust gas emitted from said tail pipes laterally and forward to constitute thrust-reversing means, downwardly directed control jet means including a nose jet, a tail jet and two wing jets carried by said wing at opposite sides of said hollow mast for projecting air downward to product trim control forces, and means for supplying air under pressure from said turbofan engines to said control jet means.

6. A gyrodyne comprising a high fixed wing, a hollow mast carried by said high fixed wing, contrarotating rotors carried by said rotor mast, twin turbofan engines carried by said high fixed wing at opposite sides of said hollow mast, tail pipes extending rearward from said turbofan engines and disposed in substantially spaced parallel relationship for discharging exhaust gas from said turbofan engines and forming an outrigger, an air duct extending longitudinally behind said turbofan engines for discharging an iar jet therefrom, duct means connecting said turbofan enginges, said hollow mast and said air duct for receiving bypass air from said turbofan engines, control means for supplying at least a portion of the bypass air from said turbofan engines to said air duct for effecting jet thrust for the gyrodyne, means mounting each blade of at least one of said rotors to turn about a spanwise axis of such rotor blade for altering its pitch, counterweight carried by the tip portion of each rotor blade and projecting forward beyond the major portion of the leading edge of each rotor blade turnable about a spanwise axis for substantially balancing the rotor blade statically about such axis, pitch control means for controlling the collective pitch of the blades of at least one of said rotors, brake means effective to retard the rotative speed of at least one of said rotors, means for proportioning the flow of air from said duct means through said hollow rotor mast to said rotors, horizontal stabilizer means connecting the rearward end portions of said tail pipes and said air duct, vertical control surfaces mounted on said horizontal stabilizer means in alignment with the discharge ends of said tail pipes for controlling the direction of the gyrodyne, said vertical control surfaces being bifurcated and their bifurcations being spreadable to divert exhaust gas emitted from said tail pipes laterally and forward to constitute thrust-reversing means, rotor rotation coordinating means interconnecting said contrarotating rotors for conjoint synchronized rotation thereof in opposite directions, downwardly directed control jet means including a nose jet, a tail jet and two wing jets carried by said wing at opposite sides of said hollow mast for projecting air downward to product trim control forces, and means for supplying air under pressure from said turbofan engines to said control jet means.

7. A gyrodyne comprising a fixed wing, a hollow mast mounted centrally of the gyrodyne, contrarotating rotors carried by said hollow mast, twin turbofan engines mounted at opposite sides of said hollow mast, tail pipes extending rearward from said turbofan engines and disposed in substantially spaced parallel relationship for discharging exhaust gas from said turbofan engines and forming an outrigger, duct means connecting said turbofan engines and hollow mast for receiving bypass air from said turbofan engines, brake means effective to retard the rotative speed of both of said rotors, means for proportioning the flow of air from said duct means through said hollow mast to said rotors, horizontal stabilizer means connecting the rearward end portions of said tail pipes, and vertical control surfaces mounted on said horizontal stabilizer means in alignment with the discharge ends of said tail pipes for controlling the direction of the gyrodyne, said vertical control surfaces being bifurcated and their bifurcations being spreadable to divert exhaust gas emitted from said tail pipes laterally and forward to constitute thrust-reversing means.

* * * * *

UNITED STATES PATENT AND TRADEMARK OFFICE
CERTIFICATE OF CORRECTION

PATENT NO. : 4,589,611
DATED : May 20, 1986
INVENTOR(S) : Ramme, Maurice and Monte Ramme It is certified that error appears in the above-identified patent and that said Letters Patent are hereby corrected as shown below:

Claim 1: Column 11, line 64, delete "hollow"; line 68, delete "hollow".

Claim 3: Column 12, line 24, delete "sald" and insert ...said...

Claim 5: Column 13, line 24, change "relationships" to ...relationship...; line 45, change "surface" to ...surfaces...; line 52, delete "product" and insert ...produce...

Claim 6: Column 14, line 3, delete "iar" and insert ...air...; line 35, delete "product" and insert ...produce...

Signed and Sealed this

Nineteenth Day of August 1986

[SEAL]

Attest:

DONALD J. QUIGG

Attesting Officer    Commissioner of Patents and Trademarks

UNITED STATES PATENT AND TRADEMARK OFFICE
CERTIFICATE OF CORRECTION

PATENT NO. : 4,589,611
DATED : May 20, 1986
INVENTOR(S) : Ramme, Maurice and Monte Ramme It is certified that error appears in the above-identified patent and that said Letters Patent are hereby corrected as shown below:

Claim 3: Column 12, line 16, after "mast", insert: ...twin turbofan engines mounted at opposite sides of said rotor mast,...; line 26, delete "eifecting" and insert ...effecting...

Claim 4: Column 12, line 55, change "controtating" to ...contrarotating...

Claim 6: Column 13, line 57, cancel "rotor" and insert ...hollow...; column 14, line 11, after "counterweight" insert ...means...;

Signed and Sealed this

Sixteenth Day of December, 1986

Attest:

DONALD J. QUIGG

Attesting Officer — Commissioner of Patents and Trademarks